US012360912B2

(12) United States Patent
Poremba et al.

(10) Patent No.: US 12,360,912 B2
(45) Date of Patent: Jul. 15, 2025

(54) APPROACH FOR PROVIDING INDIRECT ADDRESSING IN MEMORY MODULES

(71) Applicant: Advanced Micro Devices, Inc., Santa Clara, CA (US)

(72) Inventors: Matthew R. Poremba, Bellevue, WA (US); Alexandru Dutu, Bellevue, WA (US); Sooraj Puthoor, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/561,406

(22) Filed: Dec. 23, 2021

(65) Prior Publication Data
US 2023/0205705 A1 Jun. 29, 2023

(51) Int. Cl.
*G06F 12/10* (2016.01)
(52) U.S. Cl.
CPC .................................. *G06F 12/10* (2013.01)
(58) Field of Classification Search
CPC ............. G06F 12/1009; G06F 12/0246; G06F 11/1068; G06F 3/0679; G06F 3/061; G06F 3/0659; G06F 12/10; G06F 2212/68; G06F 11/0751; G06F 2212/657; G06F 12/0292; G06F 11/073; G06F 12/1027; G06F 12/109
USPC ......... 711/103, E12.008, 203, 206, E12.001, 711/E12.096
See application file for complete search history.

(56) References Cited

U.S. PATENT DOCUMENTS

| | | | |
|---|---|---|---|
| 2002/0144001 A1* | 10/2002 | Collins | H04L 61/00 711/E12.067 |
| 2004/0123068 A1* | 6/2004 | Hashimoto | G06F 12/0866 711/E12.019 |
| 2006/0149919 A1* | 7/2006 | Arizpe | G06F 12/1009 710/22 |
| 2007/0226450 A1* | 9/2007 | Engbersen | G06F 12/1483 711/E12.096 |
| 2011/0029842 A1* | 2/2011 | Grube | G06F 3/064 714/763 |
| 2014/0040592 A1 | 2/2014 | Fleischer et al. | |
| 2015/0248355 A1* | 9/2015 | Levenglick | G06F 12/1009 711/163 |
| 2016/0062911 A1 | 3/2016 | Kegel et al. | |

(Continued)

*Primary Examiner* — Jared I Rutz
*Assistant Examiner* — Edward Waddy, Jr.
(74) *Attorney, Agent, or Firm* — Hickman Becker Bingham Ledesma LLP

(57) ABSTRACT

An approach provides indirect addressing support for PIM. Indirect PIM commands include address translation information that allows memory modules to perform indirect addressing. Processing logic in a memory module processes an indirect PIM command and retrieves, from a first memory location, a virtual address of a second memory location. The processing logic calculates a corresponding physical address for the virtual address using the address translation information included with the indirect PIM command and retrieves, from the second memory location, a virtual address of a third memory location. This process is repeated any number of times until one or more indirection stop criteria are satisfied. The indirection stop criteria stop the process when work has been completed normally or to prevent errors. Implementations include the processing logic in the memory module working in cooperation with a memory controller to perform indirect addressing.

20 Claims, 6 Drawing Sheets

(56) References Cited

U.S. PATENT DOCUMENTS

| | | | |
|---|---|---|---|
| 2016/0071608 A1* | 3/2016 | Bronner | G11C 16/3418 |
| | | | 365/185.18 |
| 2018/0025768 A1* | 1/2018 | Hush | G11C 11/4091 |
| | | | 365/208 |
| 2021/0055864 A1* | 2/2021 | Noh | G06F 3/0619 |
| 2021/0294746 A1* | 9/2021 | Yudanov | G06F 12/1009 |
| 2021/0373951 A1* | 12/2021 | Malladi | G06F 9/5016 |
| 2022/0114118 A1* | 4/2022 | Lee | G06F 3/061 |
| 2022/0237112 A1* | 7/2022 | Martin | G06F 12/1063 |

* cited by examiner

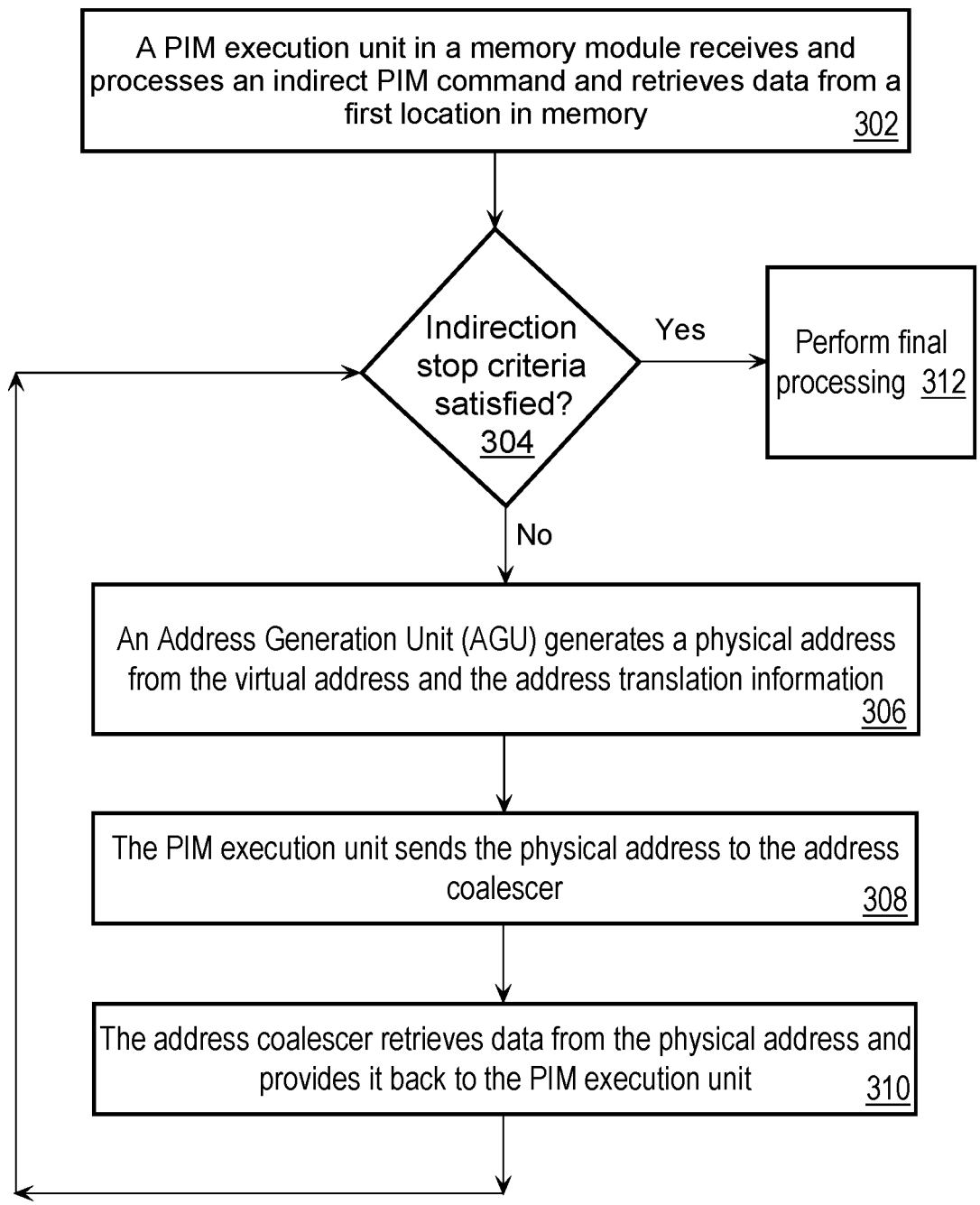

APPROACH FOR PROVIDING INDIRECT ADDRESSING IN MEMORY MODULES

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. The vector compute elements and the local registers allow a memory module to perform some computations locally, such as arithmetic computations. This allows a memory controller to trigger local computations at multiple memory modules in parallel without requiring data movement across the memory module interface, which can greatly improve performance, particularly for data-intensive workloads.

One of the issues with PIM is that it does not support indirect addressing. For computing applications that use indirect addressing, for example to perform pointer chasing, tree traversal, graphing algorithms, etc., PIM elements must communicate with the host for address translation, since the host has the necessary Translation Lookaside Buffers (TLBs), page table walkers, etc., to perform address translation. This can require a large number of serialized round trip communications between the PIM elements and the host, which increases traffic across the memory module interface and increases power consumption, undermining the benefits of PIM.

One solution for providing indirect addressing capability for PIM is to implement, in memory modules, the address translation mechanisms that are normally implemented on the host side. This might include, for example, implementing TLBs, page table walkers, etc., within memory modules. This would allow PIM elements to perform address translation locally without having to rely upon the host for address translation, which would improve performance and reduces power consumption. This solution, however, comes with significant costs in the form of increased hardware area, address translation synchronization issues between the memory module and the host, and changing memory page permissions. In view of the foregoing, there is therefore a need for an approach for providing indirect addressing support for PIM that avoids the limitations and costs of other solutions.

BRIEF DESCRIPTION OF THE DRAWINGS

Implementations are depicted by way of example, and not by way of limitation, in the figures of the accompanying drawings and in which like reference numerals refer to similar elements.

FIG. 3A is a flow diagram that depicts performing indirect addressing in memory modules using indirect PIM commands to perform a search of linked data.

DETAILED DESCRIPTION

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
II. Architecture
III. Indirect PIM Commands
IV. Processing Indirect PIM Commands I. Overview An approach provides indirect addressing support for PIM. Indirect PIM commands include address translation information that allows memory modules to perform indirect addressing. Processing logic in a memory module processes an indirect PIM command and retrieves, from a first memory location, a virtual address of a second memory location. The processing logic calculates a corresponding physical address for the virtual address using the address translation information included with the indirect PIM command and retrieves, from the second memory location, a virtual address of a third memory location. This process is repeated any number of times until one or more indirection stop criteria are satisfied. The indirection stop criteria stop the process when work has been completed normally or to prevent errors, as described in more detail hereinafter. Implementations include the processing logic in a memory module working in cooperation with a memory controller to perform indirect addressing.

The approach provides a lightweight solution without employing conventional "heavy-weight" host-side address translation mechanisms, such as TLBs, page table walkers, etc., in memory modules, while preserving the performance benefits of PIM processing. The technical solution is beneficial in a wide variety of contexts by allowing processing logic in memory modules to locally determine physical addresses from virtual addresses using address translation information. This reduces the number of interactions between memory modules and host processors required to perform address translation, which improves performance and reduces energy consumption. Although implementations are described herein in the context of PIM for purposes of explanation, implementations are not limited to the PIM context and are applicable to other contexts such as Processing Near Memory (PNM) and off-chip accelerators.

Figure 1A:
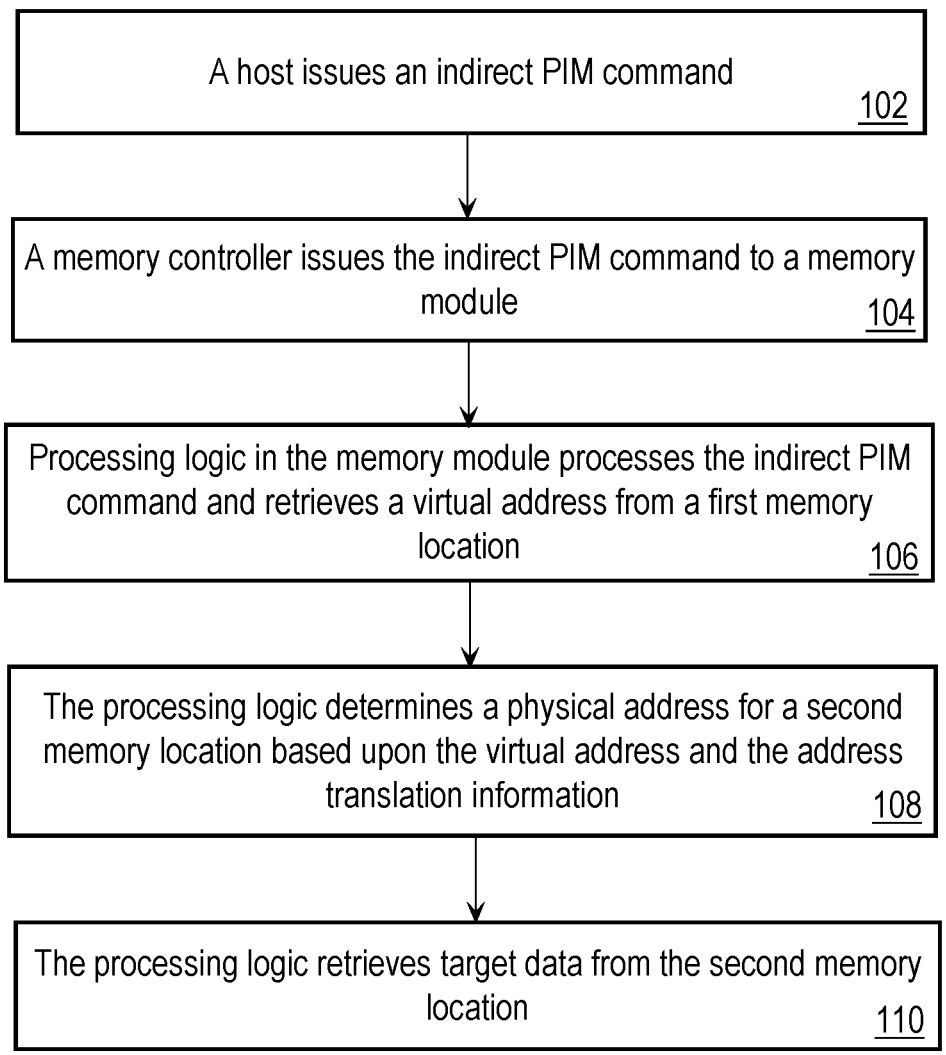
FIG. 1A is a flow diagram that depicts an approach for providing indirect addressing support for PIM.

FIG. 1A is a flow diagram 100 that depicts an approach for providing indirect addressing support for PIM. In this example, a first memory location stores the virtual address of a second memory location that stores target data.

In step 102, a host issues an indirect PIM command. As used herein, the term "indirect PIM command" refers to a PIM command that includes address translation information that allows processing logic in memory modules to perform indirect addressing. In step 104, a memory controller issues the indirect PIM command to a memory module. In step 106, processing logic in the memory module processes the indirect PIM command and retrieves a virtual address from a first memory location. In step 108, the processing logic determines a physical address for a second memory location based upon the virtual address retrieved from the first memory location and address translation information provided with the indirect PIM command. Details of the address translation information and determining physical addresses using virtual addresses and address translation information is described in more detail hereinafter. In step 110, the processing logic uses the determined physical address to retrieve the target data from the second memory location. The processing logic also performs one or more operations specified by the indirect PIM command, for example, performing a computation using the target data retrieved from the second memory location, storing a result of the computation back to the second memory location, etc. As described in more detail herein, retrieving the target data from the second memory location may involve cooperation with a memory controller to configure memory elements, such as banks, to properly retrieve the target data from the second memory location.

II. Architecture

Figure 1B:
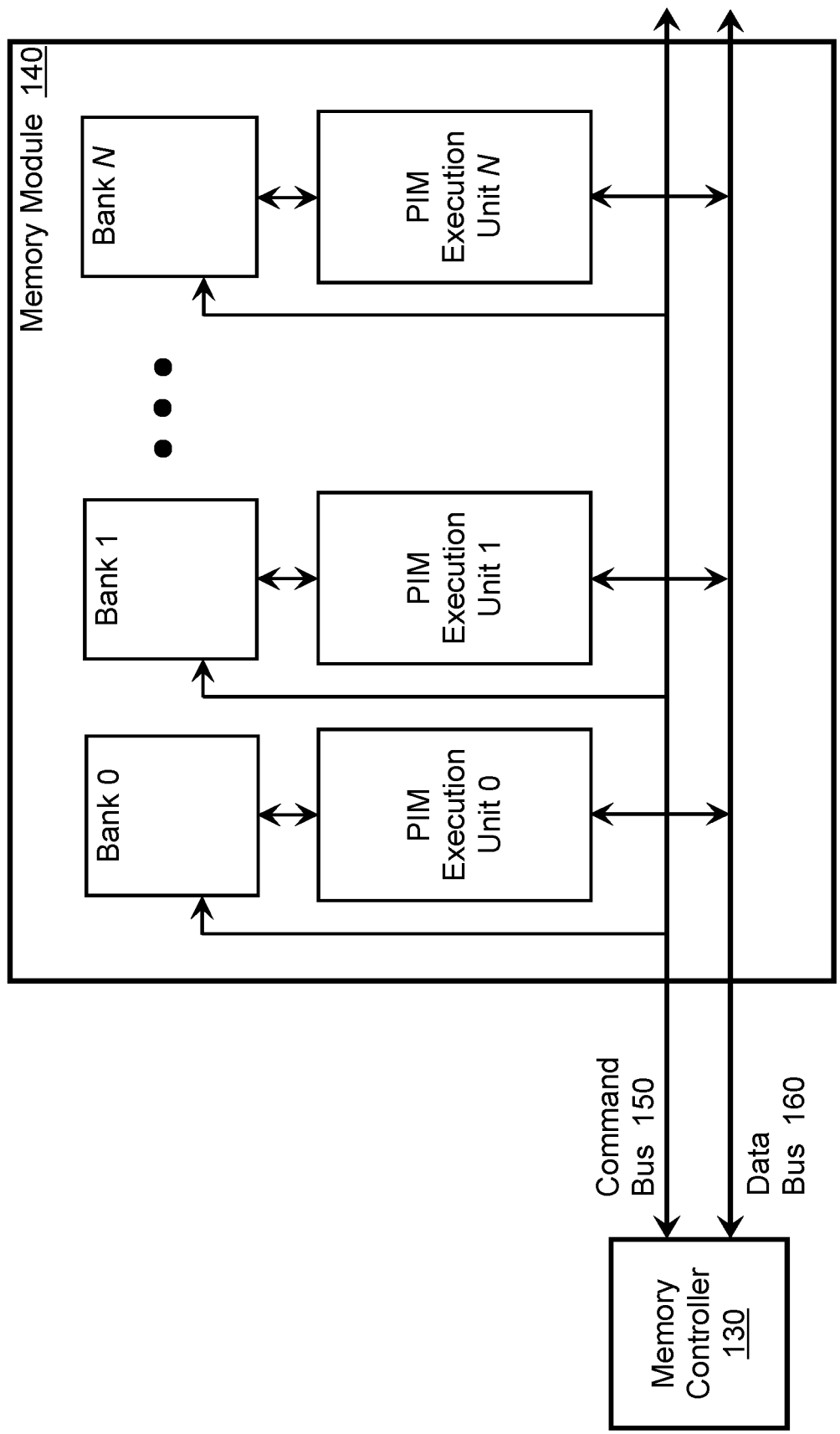
FIG. 1B is a block diagram that depicts a memory arrangement.

FIG. 1B is a block diagram that depicts a computing arrangement 120. The computing arrangement 120 includes a memory controller 130 and a memory module 140. The computing arrangement 120 is implemented in any type of computing device including, for example, processors and a System on a Chip (SoC). The memory controller 130 and the memory module 140 are communicatively coupled via a command bus 150 and a data bus 160. As used herein, the term "bus" refers to any type of wired or wireless electrical coupling, such as wires, conductors, and/or wireless communications links. Implementations are depicted in the figures and described herein in the context of a single memory module 140 for purposes of explanation, but implementations are applicable to memory arrangements with any number of memory modules. The computing arrangement 120 may include other elements that are not depicted in the figures and described herein for purposes of explanation.

The memory module 140, which may be for example a DRAM memory module, includes a memory array having N+1 banks (Bank 0-Bank N) with corresponding PIM execution units (PIM Execution Unit 0-PIM Execution Unit N). Each bank includes cells defined by a two-dimensional array, but implementations are not limited to DRAM memory modules or banks per se, or banks with memory cells defined by a two-dimensional array and are applicable to other memory cell organizations. The memory array and banks may include other elements, such as buffers and decoders, which are not depicted in the figures and described herein for purposes of explanation.

The PIM execution units include processing logic and storage, such as local registers, for processing PIM commands, e.g., to perform logical operations, arithmetic operations, etc. Although the example of FIG. 1 depicts a separate PIM execution unit for each bank, implementations include a PIM execution unit, and the corresponding processing logic and storage, servicing multiple (or all) banks, including any type of near-memory processing.

The memory controller 130 manages the flow of data going to and coming from the memory module 140 and is implemented in different ways depending upon a particular implementation, such as a stand-alone element, for example on a separate die from a microprocessor, implemented separate from but on the same die as a microprocessor, or integrated into a microprocessor as an integrated memory controller. Implementations are applicable to any type of memory controller 130 and according to an implementation, the memory controller 130 includes processing logic that is configured to issue commands to the memory module 140.

Figure 1C:
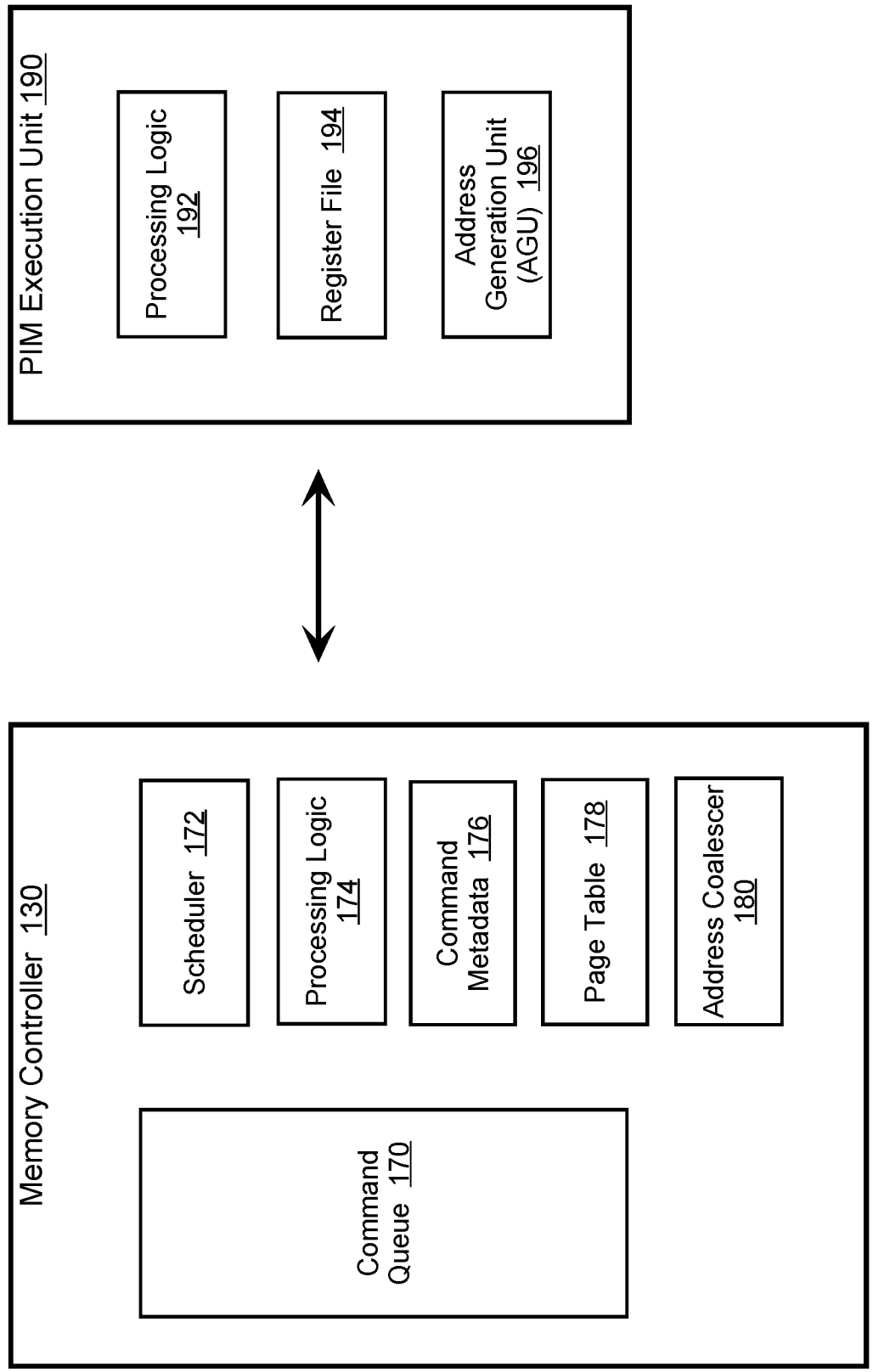
FIG. 1C depicts an example implementation of the memory controller and a PIM execution unit.

FIG. 1C depicts an example implementation of the memory controller 130 and a PIM execution unit 190. In this example, the memory controller 130 includes a command queue 170, a scheduler 172, processing logic 174, command metadata 176 a page table 178, and an address coalescer 180. The memory controller 130 includes fewer or additional elements that vary depending upon a particular implementation and that are not depicted in the figures and described herein for purposes of explanation. In addition, the functionality provided by the various elements of the memory controller 130 are combined in any manner, depending upon a particular implementation.

The command queue 170 stores memory commands received by the memory controller 130, for example from one or more threads executing on a Central Processing Unit (CPU), Graphics Processing Unit (GPU), or other processor. According to an implementation, memory commands include PIM commands and non-PIM commands. PIM commands are broadcast memory commands directed to multiple memory elements in a memory module, such as multiple banks in a DRAM memory module. The target memory elements are specified by one or more bit values, such as a bit mask, in the PIM commands, and specify any number, including all, of the available target memory elements. PIM commands cause some processing to be performed by multiple, including all, of the specified memory elements in the memory module 140, such as a logical operation and/or a computation. As one non-limiting example, a PIM command specifies that at each target bank, a value is read from memory at a specified row and column into a local register, an arithmetic operation performed on the value, and the result stored back to memory. Examples of non PIM commands include, without limitation, load (read) commands, store (write) commands, etc. Unlike PIM commands that are broadcast memory processing commands and directed to multiple target banks, non-PIM commands are directed to a single bank, i.e., are bank specific.

The command queue 170 stores commands to be issued by the memory controller 130. According to an implementation, the memory controller 130 stores PIM commands and non-PIM commands in the command queue 170 as they are received. Commands are stored in open slots of the command queue 170 and commands are grouped by type or in order of receipt regardless of type, depending upon a particular implementation. The command queue 170 is implemented by any type of storage capable of storing memory commands. Although implementations are depicted in the figures and described herein in the context of the command queue 170 being implemented as a single element, implementations are not limited to this example and according to an implementation, the command queue 170 is implemented by multiple elements, for example, a separate command queue for each of the banks in the memory module 140. The scheduler 172 schedules memory commands for processing based upon various selection criteria.

The processing logic 174 stores memory commands in the command queue 170 and is implemented by computer hardware, computer software, or any combination of computer hardware and computer software. The command metadata 176 specifies one or more attributes of memory commands stored in the command queue 170, such as the type of command, e.g., PIM or non-PIM, a date and/or time when a memory command was stored in the command queue 170, a relative ordering of a memory command in the command queue 170, the type of command, command status, etc.

The page table 178 includes data that specifies the current state of one or more memory elements within a memory module and is used by the processing logic 174 to configure memory elements to process memory commands. For example, the page table 178 includes an entry for each bank of the memory module 140, where each entry specifies whether the corresponding bank currently has an open (activated) row from the most recent non-PIM command directed to that bank, if any, and if so, which row is currently open, e.g., via a row ID. When a row is opened or closed (deactivated) the processing logic 174 updates the corresponding entry in the page table 178.

The address coalescer 180 interacts with the PIM execution unit 190 to provide support for indirect addressing in the memory module 140. According to an implementation, the address coalescer 180 receives physical addresses determined by the PIM execution unit 190 using address translation information in indirect PIM commands. The address coalescer 180 issues memory commands using the physical addresses, and provides results of the memory commands back to the PIM execution unit 190, as described in more detail hereinafter. The address coalescer 180 interacts with other elements in the memory controller 130 to implement this functionality. Although depicted in FIG. 1C as part of the memory controller 130, implementations are not limited to this example, and the address coalescer 180 may be implemented external to the memory controller 130 as a client element.

The PIM execution unit 190 is an example implementation of the PIM Execution Units 0 through N of FIG. 1B. In the example depicted in FIG. 1C, the PIM execution unit 190 includes processing logic 192, a register file 194 and an Address Generation Unit (AGU) 196. The processing logic 192 processes PIM commands including performing loads (reads) and stores (writes) to memory and computations, such as arithmetic and logic operations. The register file 194 is any type of local storage, such as a group of registers used by the processing logic 192 to perform local computations, to store results, etc. The AGU 196 determines corresponding physical addresses for virtual addresses using address translation information provided with indirect PIM commands. According to an implementation, the processing logic 192 is also configured to determine whether indirection stop criteria are satisfied, as described in more detail hereinafter. The AGU 196 is depicted in the figures and described herein as a separate element within the PIM execution unit 190 for purposes of explanation, but this is not required, and implementations include the functionality of the AGU 196 being implemented in other elements of the PIM execution unit 190, such as the processing logic 192.

III. Indirect PIM Commands

As previously mentioned, indirect PIM commands are PIM commands that include address translation information that is used by processing logic in memory modules to performing indirect addressing. This includes determining physical addresses from virtual addresses using the address translation information for indirect addressing.

According to an implementation, software support is provided for indirect PIM commands. For example, from a software developer perspective, PIM commands augmented with a "+" or other designated symbol indicate that indirect addressing is to be used to process the PIM commands at memory modules. Alternatively, a set of special indirect PIM commands may be provided as part of a software library. When an indirect PIM command is compiled and executed, the host issues an indirect PIM command with one or more bit values selected to designate the command as an indirect PIM command to invoke indirect processing at memory modules as described herein. According to an implementation, indirect PIM commands specify whether the results, e.g., the virtual address of a target memory location such as an insertion point in a list or a target node in a tree, are to be cached on the host.

Figure 2:
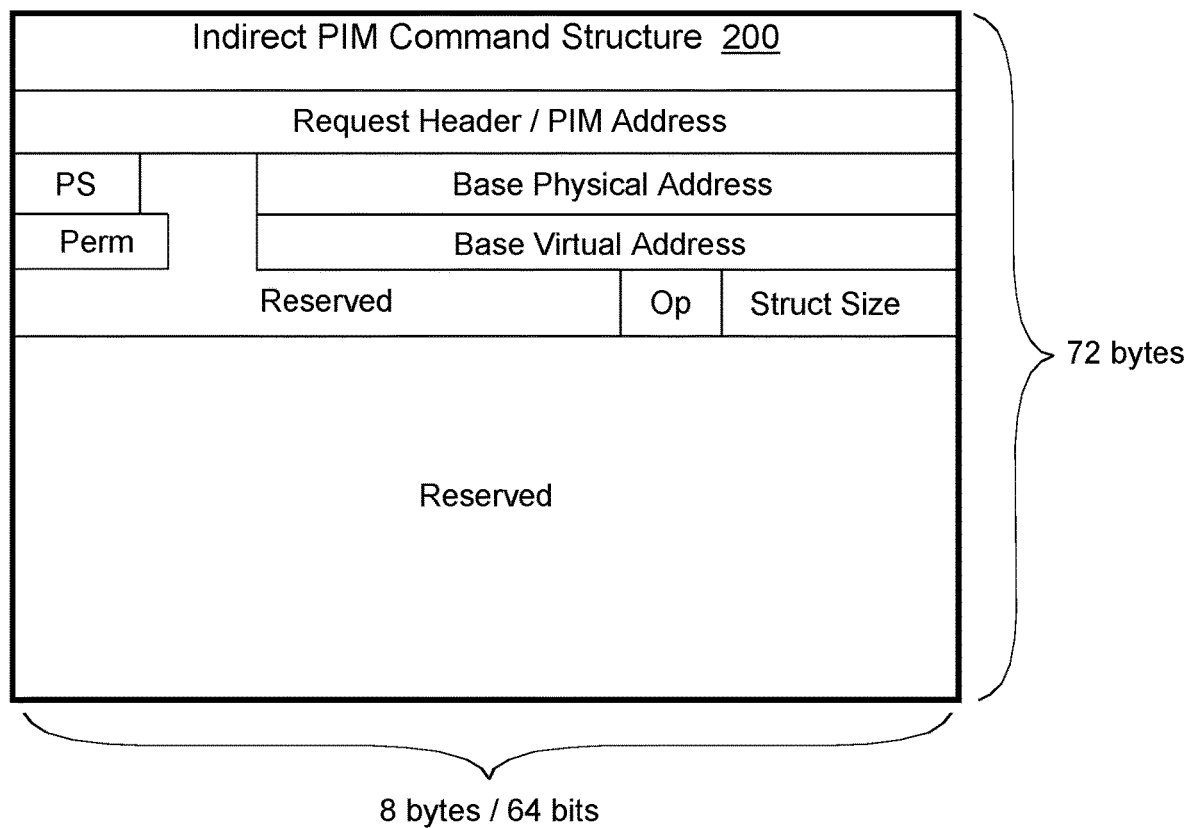
FIG. 2 is a block diagram that depicts an example indirect PIM command structure according to an implementation.

FIG. 2 is a block diagram that depicts an example indirect PIM command structure 200 according to an implementation. In this example, the indirect PIM command structure 200 is eight bytes by 72 bytes (8 bits per byte) and includes a Request Header/PIM Address field that identifies the PIM command has an indirect PIM command and one or more target memory elements to process the indirect PIM command, such as one or more DRAM banks specified by a bit mask.

The PIM command structure 200 includes a Page Size (PS), which may be encoded in PS bits, e.g., 00=4 kB, 01=2 MB, 10=1 GB, etc., and read/write permission bits (Perm). The PIM command structure 200 also includes an operation to be performed (OP), which may be represented by an opcode, and a structure size (Struct Size), which indicate the size of the data structure to be traversed to enable the next address to be calculated. The PIM command structure 200 also includes a Base Physical Address for the PIM command that is considered when translating the address of an indirect access and a Base Virtual Address that is considered when calculating the address of an indirect access. Finally, the PIM command structure 200 includes a reserved area for payload data for the memory operation being performed. The PIM command structure 200 of FIG. 2 is compact, no larger than a standard memory write request, which incurs low overhead and is compatible with existing data paths in memory subsystems. Implementations are not limited to the example PIM command structure 200 depicted in FIG. 2 and different fields are used depending upon the requirements of a particular implementation.

IV. Processing Indirect PIM Commands

Indirect addressing in memory modules is provided by processing logic within a memory module working in cooperation with a memory controller. When processing logic within a memory module retrieves a virtual address from memory, the processing logic determines a physical address based upon the virtual address and the address translation information included in the indirect PIM command. The processing logic provides the physical address to a memory controller that issues a memory command to retrieve data from the physical address and returns the results to the processing logic in the memory controller. This process is repeated any number of times until one or more indirection stop criteria are satisfied.

According to an implementation, the indirection stop criteria include a normal completion. A normal completion occurs when work is completed normally, as indicated, for example, by data in the payload of the indirect PIM command. For example, work is completed normally when the results that the memory controller retrieved from memory are target data that match data in the payload of the indirect PIM command. This is used, for example, to perform searches of linked data in memory, such as a linked list, tree, etc. In these examples the search completes normally when the target data retrieved by the memory controller matches the data carried in the payload of the indirect PIM command. The virtual address associated with the memory location is then provided as the search result, i.e., the address of the item or node being searched for.

According to another implementation, the indirection stop criteria include one or more of whether the retrieved virtual address is outside the current virtual page, or whether the process has reached a maximum indirection depth to prevent deadlocks, cycles, or loops in pointers.

Figure 3B:
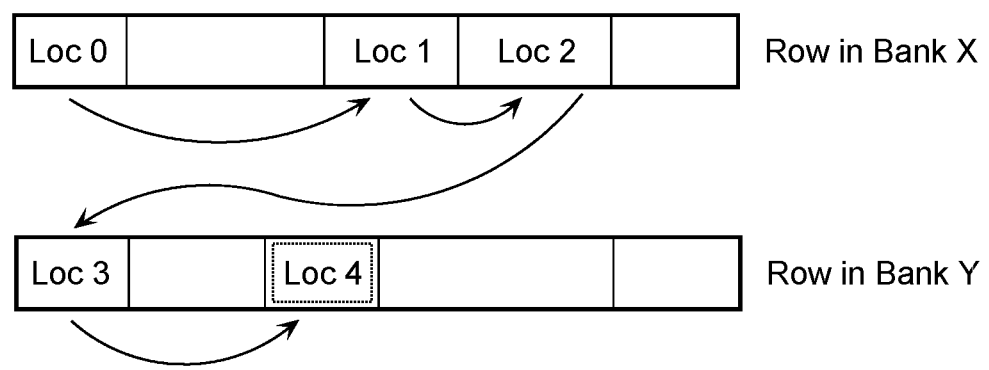
FIG. 3B depicts linked data in memory.

FIG. 3A is a flow diagram 300 that depicts performing indirect addressing in memory modules using indirect PIM commands to perform a search of linked data, such as a linked list, a tree, etc. FIG. 3B depicts linked data in memory. In this example, each of the four highlighted locations Loc 0 through Loc 4 contains a data value, or multiple data values including, for example a data structure, and an address, i.e., a pointer. The pointer in the first location Loc 0 points to Loc 1, which points to Loc 2, which points to Loc 3, which points to Loc 4. In this example, a search is performed, using indirect addressing, for the memory location that contains the target data carried in the payload of an indirect PIM command. Implementations are applicable to searching linked data in the form of trees where, for example, in the case of a binary tree, each of the locations Loc 0 through Loc 4 includes one or more data values and two pointers to the left and right child nodes.

A host, such as a CPU, GPU, etc., issues the indirect PIM command and in step 302, the PIM execution unit 190 receives and processes the indirect PIM command. The processing logic 192 recognizes the command as an indirect PIM command by one or more bit values that indicate the command is an indirect PIM command. Processing of the indirect PIM command by the processing logic 192 includes retrieving a data value and a pointer from a memory location with a physical address specified by the indirect PIM command. In the present example, a data value and pointer are retrieved from Loc 0 in Bank X of the memory module 140.

In step 304, a determination is made whether indirection stop criteria are satisfied. In the present example the indirection stop criteria include whether work has been completed, whether the retrieved virtual address is outside the current virtual page, and whether the process has reached a maximum indirection depth. Implementations are described herein in the context of the processing logic 192 determining whether any of the indirection stop criteria are satisfied for purposes of explanation, although implementations include this being performed by the AGU 196 or other elements of the PIM execution unit 190.

To determine whether the work has been completed, the target data in the payload is compared to the data that the PIM execution unit retrieved from the physical address specified by the indirect PIM command. If there is no match, then the work has not yet been completed and the next indirection stop criterium is checked.

To determine whether the retrieved virtual address, i.e., the pointer from Loc 0 is outside the current virtual page the page number of the pointer (virtual address) is compared to the page number of the base virtual address specified by the indirect PIM command.

The last indirection stop criteria of the maximum indirection depth is checked by determining whether the current indirection depth meets or exceeds the maximum indirection depth. In the present example, it is presumed that the maximum indirection depth is greater than five, i.e., beyond the traversing of Loc 4. Since the current indirection depth is one, this indirection stop criterion is not satisfied.

Assuming that none of the indirection stop criteria are satisfied, then the pointer for Loc 0 is followed to the next memory location, which in the current example is Loc 1. To accomplish this, control proceeds to step 306 where the AGU 196 generates a physical address for Loc 1 using the virtual address of Loc 1 retrieved from Loc 0 and the address translation information included in the indirect PIM command. According to an implementation, this is accomplished by subtracting the base virtual address from the address translation information from the virtual address for Loc 1 (retrieved from Loc 0) to obtain a virtual page offset, which is added to the base physical address from the address translation information to obtain the new physical address. In other words, swapping the virtual page number in the virtual address for Loc 1 (retrieved from Loc 0) with the physical page number from the base physical address in the address translation information from the indirect PIM command.

In step 308 the AGU 196 sends the physical address to the address coalescer 180. In step 310, the address coalescer 180 retrieves data from the physical address and provides it back to the PIM execution unit 190. According to an implementation, this includes the address coalescer 180, alone or in conjunction with other elements within the memory controller 130, issuing one or more memory commands, PIM or non-PIM, to the memory module 140 to retrieve the data stored at the physical address. In the present example, the address coalescer 180 retrieves a data value and a pointer from Loc 1. According to an implementation, the address coalescer 180 uses the physical address and the size of the data element, as indicated by the Struct field of the indirect PIM command structure 200, to determine the target bank(s) for the memory commands, which may span multiple banks depending upon the physical address and the size of the data element.

The issuance of the aforementioned memory command to retrieve the data stored at the physical address may be managed by the memory controller 130 in the same manner as other memory commands, for example, reordered to satisfy an ordering requirement, e.g., to support Read-After-Write (RAW), Write-After-Write (WAW), Write-After-Read (WAR), etc. Having the memory controller 130 retrieve the data from Loc 1 in this manner ensures that the banks in the memory module 140 are properly configured, e.g., that a required row is opened, to properly perform the read. Control then returns to step 304 where the indirection stop criteria are again tested.

Steps 304-310 of FIG. 3 are repeated until one or more of the indirection stop criteria are satisfied in step 304 and control proceeds to step 312 where final processing is performed. In the present example, it is presumed that the linked data of FIG. 3B is traversed until Loc 4 is reached. At this point, the data retrieved from Loc 4 matches the target data carried in the payload of the indirect PIM command, so the work has been completed and the virtual address of Loc 4 is processed in accordance with the indirect PIM command, e.g., provided to the host, stored in a specified location in memory, etc.

In the event that either the retrieved pointer (virtual address) is outside the current virtual page, or the current indirection depth satisfies, e.g., meets or exceeds, the maximum indirection depth, then the PIM execution unit 190 generates an error code and/or message that is provided to the memory controller 130 and processed accordingly. In the case where the next pointer has a virtual address that is outside the current virtual page, the error message, which may be a no acknowledge (NACK) message, the virtual address is included so that it can be processed by the host. The host, having complete information for translating all virtual addresses, determines the physical address for the provided virtual address. The host issues another indirect PIM command with the updated address translation information, including the updated virtual address, physical address, page size, and permissions.

The approach described herein for performing indirect addressing in memory modules allows multiple levels of indirection to be performed at a memory module or at a memory module in cooperation with a memory controller with minimal involvement of a host. This retains the benefits of PIM without the additional cost of communicating with a host to perform address translations. The approach is particularly beneficial for performing searches of linked data, for example, linked lists and trees. For example, the approach may be used for binary tree insertion where the node containing the insertion point is located when a data value in the payload of the indirect PIM command matches the data value stored at a particular memory location. The virtual address of the particular memory location, which is the insertion point, is returned to the host.

According to an implementation, the size of the data structure, as indicated by the Struct field in the PIM command structure 200 is used to perform memory searches. Given a starting physical address in memory, the AGU 196 determines a next physical address based upon the physical address of the current memory location and the size of the data structure, as indicated by the Struct field. For example, referring again to FIG. 3B, the AGU 196 determines the physical address for Loc 1 by adding the value of the Struct field for the current indirect PIM command to the physical address for Loc 0.

The approach may be performed for multiple banks in parallel. In addition, according to an implementation, the processing of indirect PIM commands as described herein is interleaved with non-indirect PIM commands, for example, while physical addresses are calculated. Although implementations are described herein in the context of PIM, implementations are not limited to the PIM and PNM contexts and are applicable to other interconnection standards, such as Compute Express Link (CXL), other accelerators, etc.

The invention claimed is:

1. A memory module configured to:
retrieve, from a first memory location in the memory module, an address of a second memory location in the memory module, and
in response to determining that a maximum indirection has not been reached, based upon at least a portion of the address of the second memory location, retrieve data from the second memory location.

2. The memory module of claim 1, wherein:
the address of the second memory location is a virtual address of the second memory location, and
the memory module is further configured to use at least a portion of the virtual address of the second memory location to determine a physical address of the second memory location.

3. The memory module of claim 1, wherein:
the address of the second memory location is a virtual address of the second memory location, and
the memory module is further configured to determine a physical address of the second memory location using:

a) at least a portion of the virtual address of the second memory location and
b) included in a memory command, physical address information for the first memory location.

4. The memory module of claim 3, wherein the physical address of the second memory location is a sum of:
a) a physical address of the first memory location and
b) a subtractive difference between the virtual address of the second memory location and a virtual address of the first memory location.

5. The memory module of claim 1, wherein:
the address of the second memory location is a virtual address of the second memory location, and
the memory module is further configured to in response to the data from the second memory location matching data in a memory command, send the virtual address of the second memory location to a memory controller.

6. The memory module of claim 1, wherein:
the address of the second memory location is a virtual address of the second memory location,
the memory module is further configured to in response to determining that the virtual address of the second memory location is not within a same virtual page as a virtual address for the first memory location, generating and sending an error to a memory controller.

7. The memory module of claim 1, further configured to generate and send an error to a memory controller in response to determining that the maximum indirection has been reached.

8. The memory module of claim 1, further configured to perform the retrieving steps in response to a processing in memory (PIM) command.

9. The memory module of claim 1, further configured to retrieve data from a third memory location that is determined based upon a physical address of the first memory location and a data structure size specified by a memory command.

10. A memory module configured to:
retrieve, from a first memory location in the memory module, a virtual address of a second memory location in the memory module,
determine, in response to determining that a maximum indirection has not been reached, using at least a portion of the virtual address of the second memory location, a physical address of the second memory location,
send the physical address of the second memory location to a memory controller, and
receive, from the memory controller, data from the second memory location.

11. The memory module of claim 10, further configured to determine the physical address of the second memory location using the at least a portion of the virtual address of the second memory location and physical address information for the first memory location.

12. The memory module of claim 10, wherein the physical address of the second memory location is a sum of:
a) a physical address of the first memory location and
b) a subtractive difference between the virtual address of the second memory location and a virtual address of the first memory location.

13. The memory module of claim 10, further configured to in response to the data from the second memory location matching data in a memory command, send the virtual address of the second memory location to a memory controller.

14. The memory module of claim 10, further configured to in response to determining that the virtual address of the second memory location is not within a same virtual page as a virtual address for the first memory location, generating and sending an error to a memory controller.

15. The memory module of claim 10, further configured to generate and send an error to a memory controller in response to determining that the maximum indirection has been reached.

16. The memory module of claim 10, wherein:
the data from the second memory location is a virtual address of a third memory location, and
the memory module is further configured to:
determine a physical address of the third memory location using at least a portion of the virtual address of the third memory location and physical address information for the second memory location.

17. A memory controller configured to:
receive, from a first memory location in a memory module, a data value and a physical address of a second memory location in the memory module,
in response to detecting that a processing in memory (PIM) command does not contain the data value issue a memory command to read data from the second memory location, and
send the data read from the second memory location to processing logic in the memory module.

18. The memory controller of claim 17, wherein the physical address of the second memory location is determined by the memory module based upon at least a portion of a virtual address of the second memory location.

19. The memory module of claim 18, wherein the virtual address of the second memory location is stored in another memory location.

20. The memory controller of claim 17, further configured to receive, from the memory module, a virtual address that is a result of a binary tree search.

\* \* \* \* \*